(No Model.)
J. G. MOOMY.
AUTOMATIC SHUT-OFF VALVE.
No. 367,994. Patented Aug. 9, 1887.
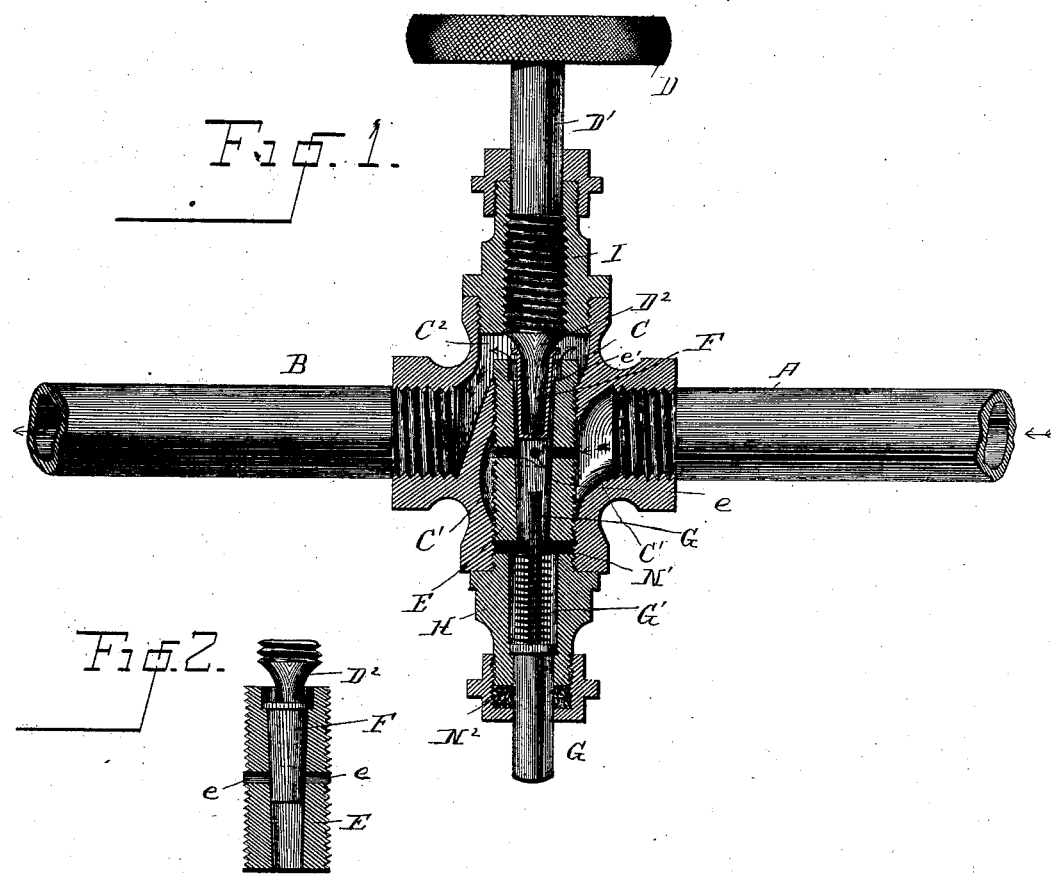
Witnesses
Wm H. Jones.
Thomas R. Griffith.
Inventor
Jos. G. Moomy
Hallock & Hulick
atty

UNITED STATES PATENT OFFICE.

JOSEPH G. MOOMY, OF ERIE, PENNSYLVANIA.

AUTOMATIC SHUT-OFF VALVE.

SPECIFICATION forming part of Letters Patent No. 367,994, dated August 9, 1887.

Application filed April 19, 1887. Serial No. 235,396. (No model.)

*To all whom it may concern:*

Be it known that I, JOSEPH G. MOOMY, a citizen of the United States, residing at Erie, in the county of Erie and State of Pennsylvania, have invented certain new and useful Improvements in Automatic Shut-Off Valves; and I do hereby declare the following to be a full, clear, and exact description of the invention, such as will enable others skilled in the art to which it appertains to make and use the same.

My invention relates to shut-off cocks; and it consists in improvements in the construction thereof whereby the valve will automatically close whenever there is a cessation in the flow of gas through the cock, as will be hereinafter fully set forth.

My device is intended particularly for use on gas-service pipes, but may be used for any fluid, the object being to provide a valve which will automatically close if for any reason a cessation in flow of fluid occurs, which is particularly desirable when the fluid is gas, and especially natural gas.

My device is illustrated in the accompanying drawings, as follows: Figure 1 is a vertical longitudinal section through the cock. Fig. 2 shows a part of the cock in section and part in elevation, and shows the valve closed, while in Fig. 1 the valve is shown open.

In external appearance the cock resembles an ordinary globe-valve. It has a shell or body, C', an outlet-chamber, C², and has screw-sockets for connecting with the pipes A and B. It also has a cap, I, with a screw valve-stem, D', with hand-wheel D, similar to the ordinary globe-valve. It further has on the side opposite the cap I a second cap, H, with a plunger, G, set therein, and made tight by a stuffing-box, N², and a gasket, N'. The plunger G is reacted by a coil-spring, G'. In the body of the valve there is screwed or otherwise seated a bush, E, having a longitudinal tapering bore, with a ledge, e', near the top and openings or ports e into it. The passage from the inlet-chamber C' to the outlet-chamber C² is through the openings or ports e into the bore of the plug and then up over the top thereof, as is indicated by dotted lines in Fig. 1. F is the valve proper. It is in the form of an inverted base of a hollow cone, with its small end closed, except that a small perforation is made through it to prevent an air-cushion forming below it when it seats, and thus prevent its seating quick. This valve has a slight rim at its large end, which seats on the ledge e'; but this rim and the ledge may be omitted, and when formed they must not interfere with the valve seating like a plug in the tapering bore.

On the screw-stem D' there is a spindle-formed point, D², which sets down into the hollow of the valve F and strikes against its closed lower end.

The valve F is not connected with the stem D', but is free to move independently. The valve F should be made as light as possible and possess sufficient rigidity and strength. When the valve F is seated, the pressure is against its sides at the openings or ports e, and no amount of pressure will lift the valve. This will be seen by observing Fig. 2. As soon as the valve is lifted off its seat, its whole outer surface is exposed to pressure, and it will be maintained off its seat by the passing fluid until the pressure nearly ceases.

To close the valve, the screw-stem D' is turned and the valve F is forced down upon its seat against the pressure of the fluid. To open the valve, the screw-stem D' is unscrewed and the plunger G is pushed in, and this will push the valve F up off its seat.

The valve, when once raised off its seat, will be maintained by the passing fluid in the position shown in Fig. 1; but if the fluid should cease to flow, or the flow become so slight that it cannot maintain the valve, it will drop and seat itself, and thus automatically cut off the passage. As long as the pressure is maintained in the inlet-pipe A the cock may be throttled down as close as desired, and thus the flow through the outlet-pipe can be perfectly regulated.

What I claim as new is—

1. In a shut-off cock, the combination, with a valve-seat, which is a tapering bore with entry-ports in its side walls, of a valve, which is a tapering plug and seats in said bore over said ports, and means, substantially as shown, for moving said valve manually.

2. In a shut-off cock, the combination of the bush E, with longitudinal tapering bore and entry-ports $e$ through the walls of said bore, the hollow tapering valve F, seating in said bore over said ports, like a plug, the screw-stem D', with a spindle, D², fitting loosely in the hollow of said valve and seating at its end, and the spring-push G, acting upon said valve oppositely to the said screw-stem.

In testimony whereof I affix my signature in presence of two witnesses.

JOSEPH G. MOOMY.

Witnesses:
JNO. K. HALLOCK,
THOMAS R. GRIFFITH.